(12) United States Patent
Zimmer et al.

(10) Patent No.: US 7,627,718 B2
(45) Date of Patent: Dec. 1, 2009

(54) FROZEN RING CACHE

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 11/639,126

(22) Filed: Dec. 13, 2006

(65) Prior Publication Data

US 2008/0147975 A1    Jun. 19, 2008

(51) Int. Cl.
  *G06F 12/00*   (2006.01)
(52) U.S. Cl. .............................. 711/130; 713/1; 711/129
(58) Field of Classification Search ........................ None
  See application file for complete search history.

(56) References Cited

U.S. PATENT DOCUMENTS

| | | | | |
|---|---|---|---|---|
| 6,807,619 B1 * | 10/2004 | Ezra et al. | .................... | 711/219 |
| 7,127,579 B2 * | 10/2006 | Zimmer et al. | .............. | 711/163 |
| 7,493,460 B2 * | 2/2009 | Zimmer et al. | .............. | 711/166 |
| 2004/0098575 A1 | 5/2004 | Datta et al. | | |
| 2004/0103272 A1 * | 5/2004 | Zimmer et al. | ................. | 713/1 |
| 2005/0144390 A1 | 6/2005 | Mattina et al. | | |
| 2006/0004963 A1 * | 1/2006 | Mattina et al. | .............. | 711/130 |
| 2006/0031593 A1 * | 2/2006 | Sinclair | ...................... | 709/251 |
| 2007/0143546 A1 * | 6/2007 | Narad | ........................ | 711/130 |

OTHER PUBLICATIONS

EPO, "European Search Report", European Application No. 07254525.4-2211/1933234; Search Report issued Apr. 17, 2009, 8 pages.
Eswaramoorthi, Nallusamy, "A Framework for Using Processor Cache as RAM (CAR)", Coreboot Documentation (slides), Oct. 10, 2005, XP002518963, University of Mexico, URL: http://wvvw.coreboot.org/images/6/6c/LBCar.pdf., whole document.

* cited by examiner

*Primary Examiner*—Hiep T Nguyen
(74) *Attorney, Agent, or Firm*—Blakely, Sokoloff, Taylor & Zafman LLP

(57) ABSTRACT

A processor having multiple cores and a multiple cache segments, each core associated with one of the cache segments, the cache segments interconnected by a data communication ring, and logic to disallow operation of the ring at a startup event and to execute an initialization sequence at one or more of the cores so that each of the one or more of the cores operates using the cache segment associated with the core as a read-write memory during the initialization sequence

19 Claims, 5 Drawing Sheets

FROZEN RING CACHE

BACKGROUND

In processor based systems or platforms having current and proposed initialization processes such as those provided by the Extended Firmware Interface (EFI), further specified at a web site accessible at www.uefi.org, early memory usage is necessary. That is, early platform initialization code may require access to a memory before the primary memory subsystems of the platform have been initialized. In one approach, such initialization code may rely upon the ability to access processor cache or a processor cache segment associated with a core of a multiple core system as random access memory (RAM), and to use this for a stack and/or a heap as may be required by the initialization code. This technique is referred to as cache-as-RAM (CAR).

In emergent cache topologies for multi-core systems, a large cache with many cache segments may be shared among the cores. Various methods of sharing are known the art that may allow for amicable cache line sharing among a plurality of cores. However, a system that is initialized in a state where a cache to be used for CAR system initialization comes up in a shareable state may create problems for early boot flows. For example, in one Pre-EFI Initialization (PEI) flow, processor cache-as-RAM is used to initialize the main memory technology (which may be one of many well known types such as double-data-rate dynamic random access (DDR) memory, among others) or an interconnection system such as the Common System Interconnect (CSI) control, decoding, and routing hardware.

Currently, a proposed boot model in such multi-core or many-core systems is to enable only one core and select this one core with a hardware state machine that runs at power up or a startup event to select the core. However, in such a scheme, this one core may become a single point of failure that compromises the overall reliability of the system.

Also, as instant-restart becomes an important feature in servers, taking advantage of multiple cores for a faster boot process is attractive. It would be desirable therefore, for pre-EFI and similar initialization software to both maximally parallelize the initialization across multiple cores and be robust in the face of a failed core or errant core or a failed or malfunctioning segment of the cache associated with a core.

DETAILED DESCRIPTION

Figure 1:
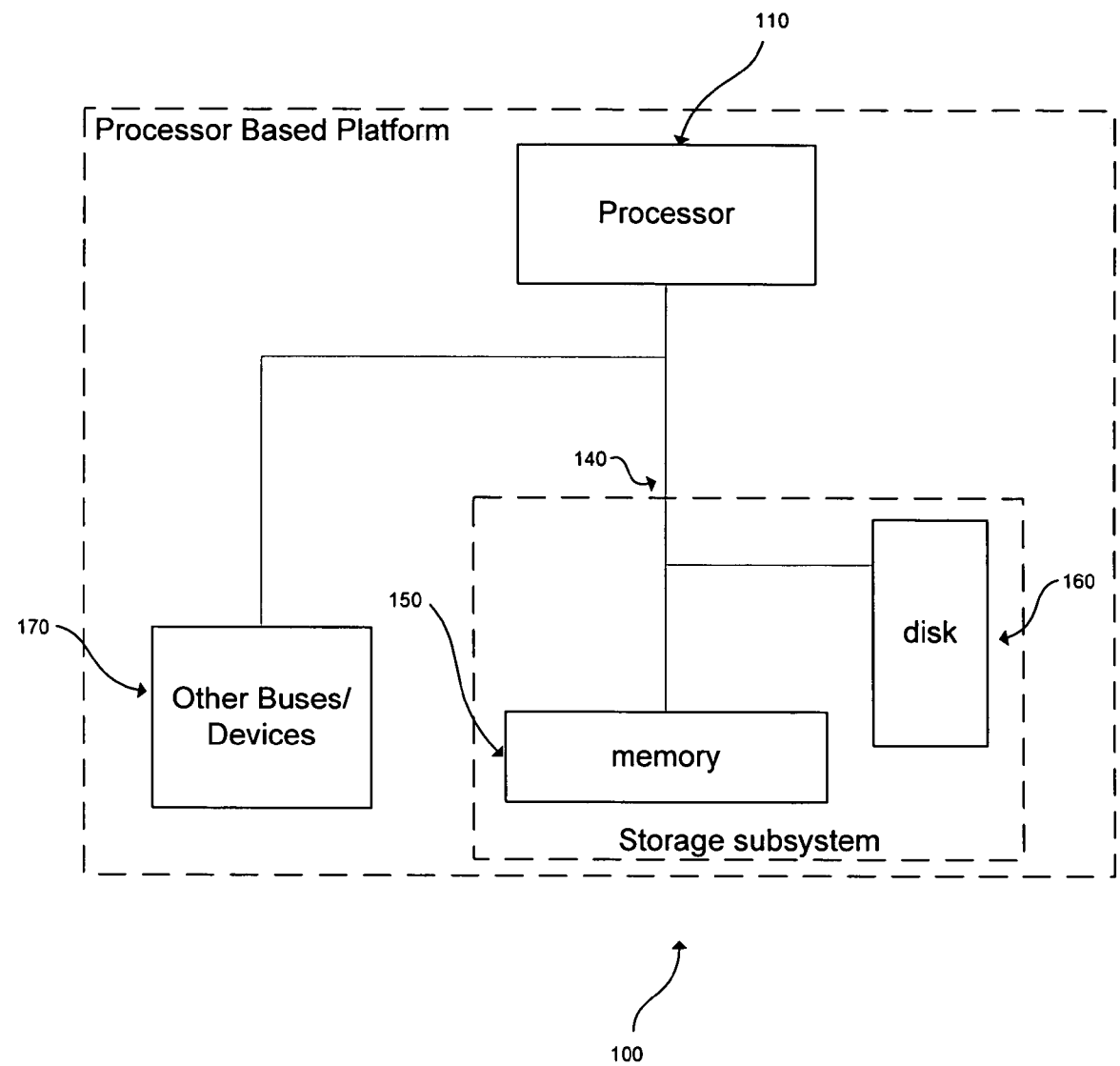
FIG. 1 shows a processor-based system in one embodiment.

FIG. 1 depicts a processor based platform 100 in one embodiment. Such a system includes a processor or processors 110, potentially with one or more cores, a storage subsystem including a read-write random access memory (RAM memory) 150 to store data and programs executable by the processor, and a non-volatile storage unit such as a disk system 160, interconnected by a bus system 140 and interfacing with the external network or users through system input/output (I/O) devices and peripherals 170. As is known, many other components such as a cache, registers, various types of controllers, etc. are also present within processor 110. Similarly other components may be present in a processor-based system, but are not depicted here in the interest of clarity.

In one embodiment, a ring cache model is used to provide a fast shared cache in a many-core system. In this proposed cache architecture, the cache access structure is a counter-rotating on-die interconnect arranged in a ring network topology (sometimes referred to as a cache ring) connecting cache segments, each segment then becoming a "stop" or connection off the ring.

Figure 2:
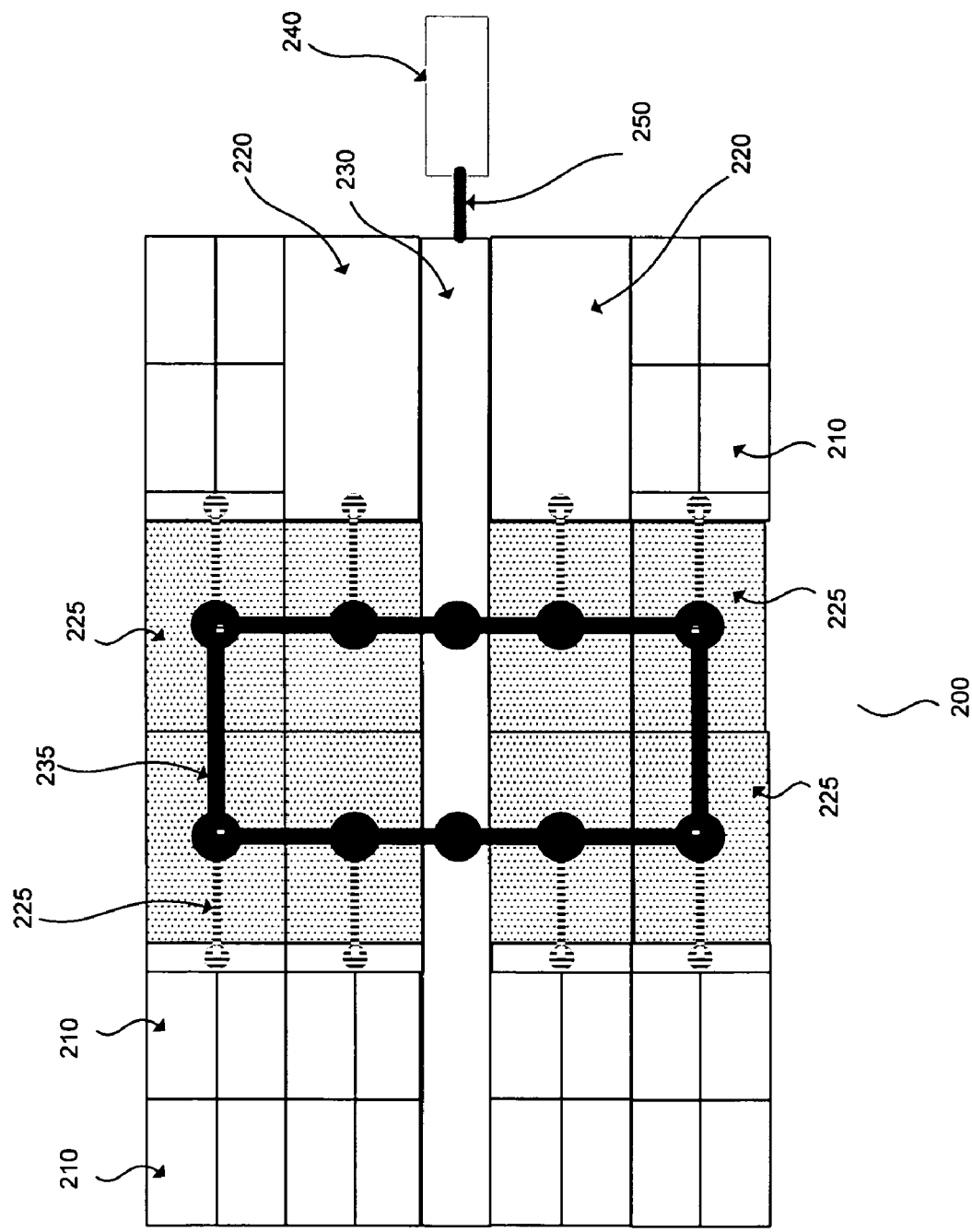
FIG. 2 shows one hardware embodiment.

FIG. 2 depicts one such ring cache structure 200 in one embodiment. In this structure, two types of processor cores, a low-power lower performance core 210 and a higher power, higher performance core 220 are present on an integrated die forming a multi-core processor. Each higher power core and each set of four low power cores is connected via a data connector 225 to ring interconnect 235, which interconnects eight cache segments 225. The ring interconnect may be composed of one, two or more rings, and the rings may be arranged so that data flows in different directions on different rings in order to improve performance (counter-rotating rings). The cache is further connected to logic circuits 230 which may include a CSI controller, a memory controller and a router for the ring network. The cache is then further connected via bus 250 to system memory 240.

Figure 3:
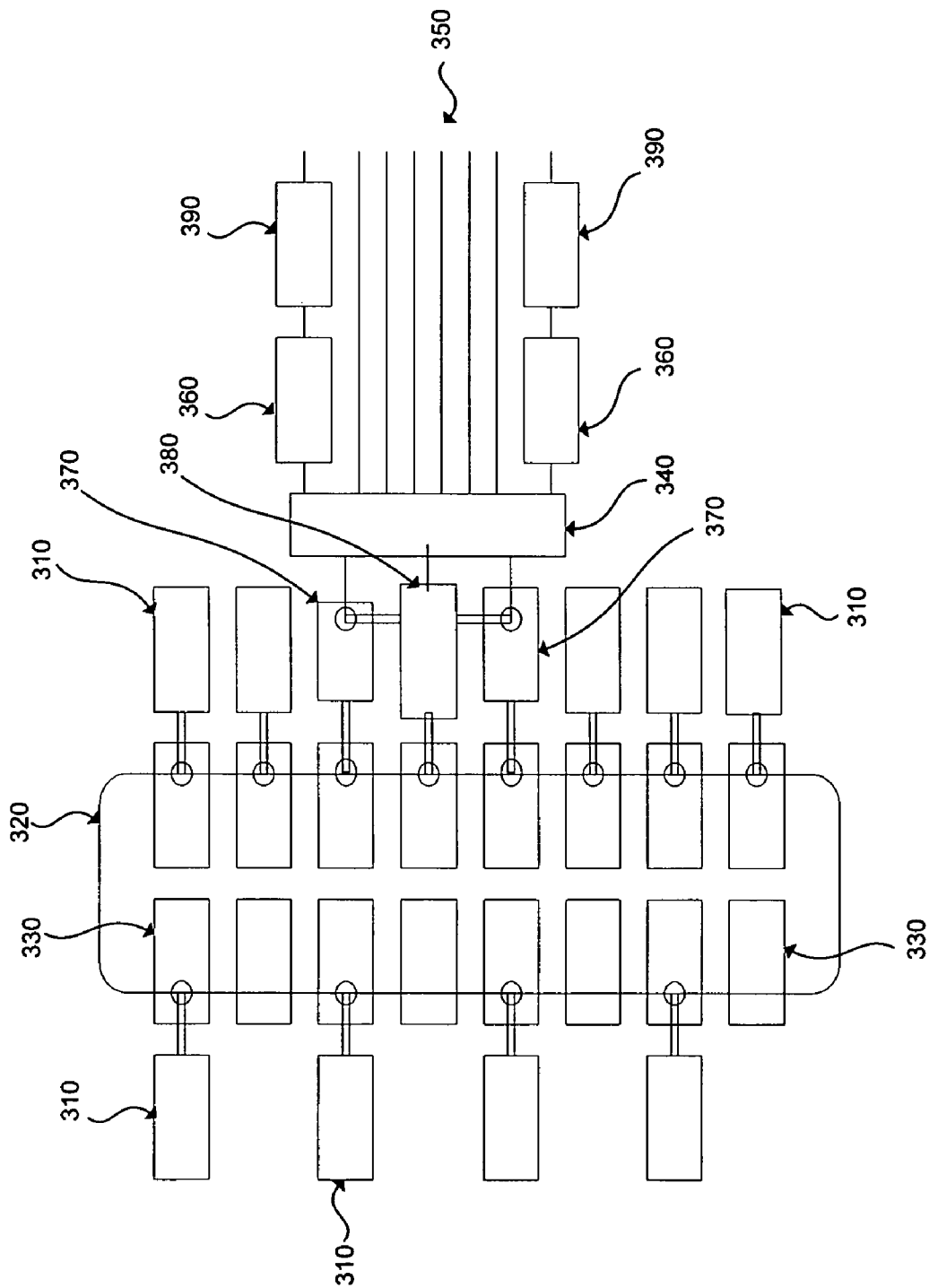
FIG. 3 shows another hardware embodiment.

Another embodiment is depicted in FIG. 3. In this embodiment, another ring cache topology is depicted. In this embodiment, processor cores 310 connect to cache segments 330 via a ring network 320. Furthermore, this embodiment may include logic such as core protocol engines 370, a Common System Interconnect (CSI) controller 380, a router 340, home protocol engines 360 and memory controllers 390 located on a system bus 350.

In general, in the embodiments disclosed above, and other embodiments with a ring cache and multi-core processor, logic at a startup event is used to repurpose such a ring network based cache into a share-nothing parallel boot-initialization model for firmware processes that execute for platform initialization. In one embodiment, the cache is available at an early phase but the ring network is "frozen" or not shared amongst the cores. In this way, each core has its own private portion of the cache ring that effectively appears to initialization software like a local random access memory. Because these memories do not communicate, they are non-coherent or local memory stores. Thus, initialization code such as PEI, in one embodiment, can have a call stack and heap for its code flows, for purposes such as CSI initialization and memory initialization. In other embodiments, the CSI flow may not be present, or may be replaced by an analogous flow for other high performance system interconnects that may need to be initialized at startup. Further, in this embodiment the cores may coordinate with a globally-coherent resource, outside the cores themselves, such as a doorbell register, to initialize the ring cache once the firmware has completed the parallel phase of its execution. The firmware may have also copied itself to system memory and continue further processing as the boot process completes.

In the case of a failed local CAR instance, there are two options. A global hardware register may be used to redirect access, or pivot access, from the core that is currently associated with the failed cache segment to a different segment. Alternatively, a global resource may be used to instruct the given core that it should yield further initialization flow to an alternate core.

Figure 4:
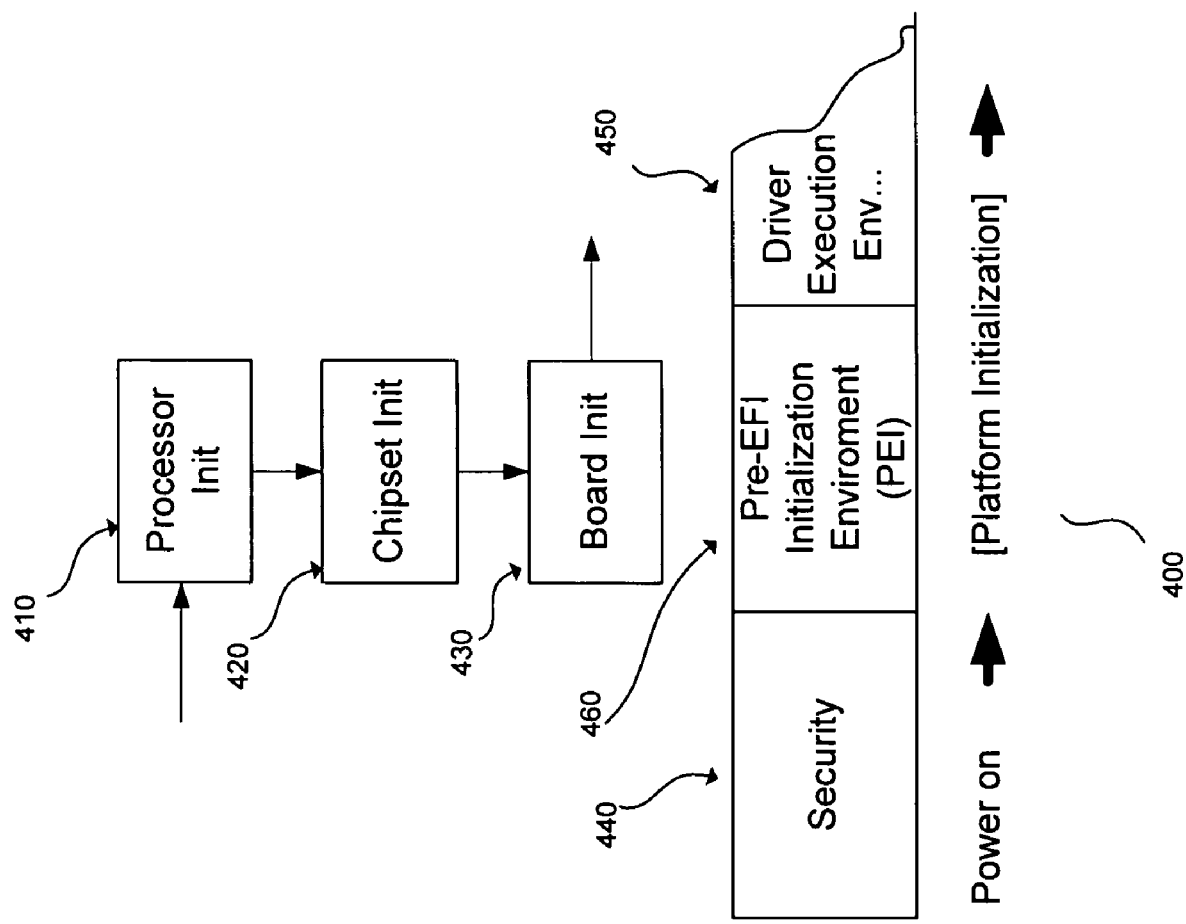
FIG. 4 depicts a boot flow in one embodiment.

FIG. 4 depicts a firmware overview flow in one embodiment. In the high level view, 440, the system at power-up or startup performs security actions and then enters the Pre-EFI or PEI environment 460 which performs platform initialization. In this phase, three major components include processor initialization 410, chipset initialization 420 and board initialization 430. In this embodiment, this is the phase of the flow during which the ring is frozen. The boot process then may continue, 450, after memory is initialized, with driver initialization and then to full operating system (OS) boot (not shown in the figure).

Figure 5:
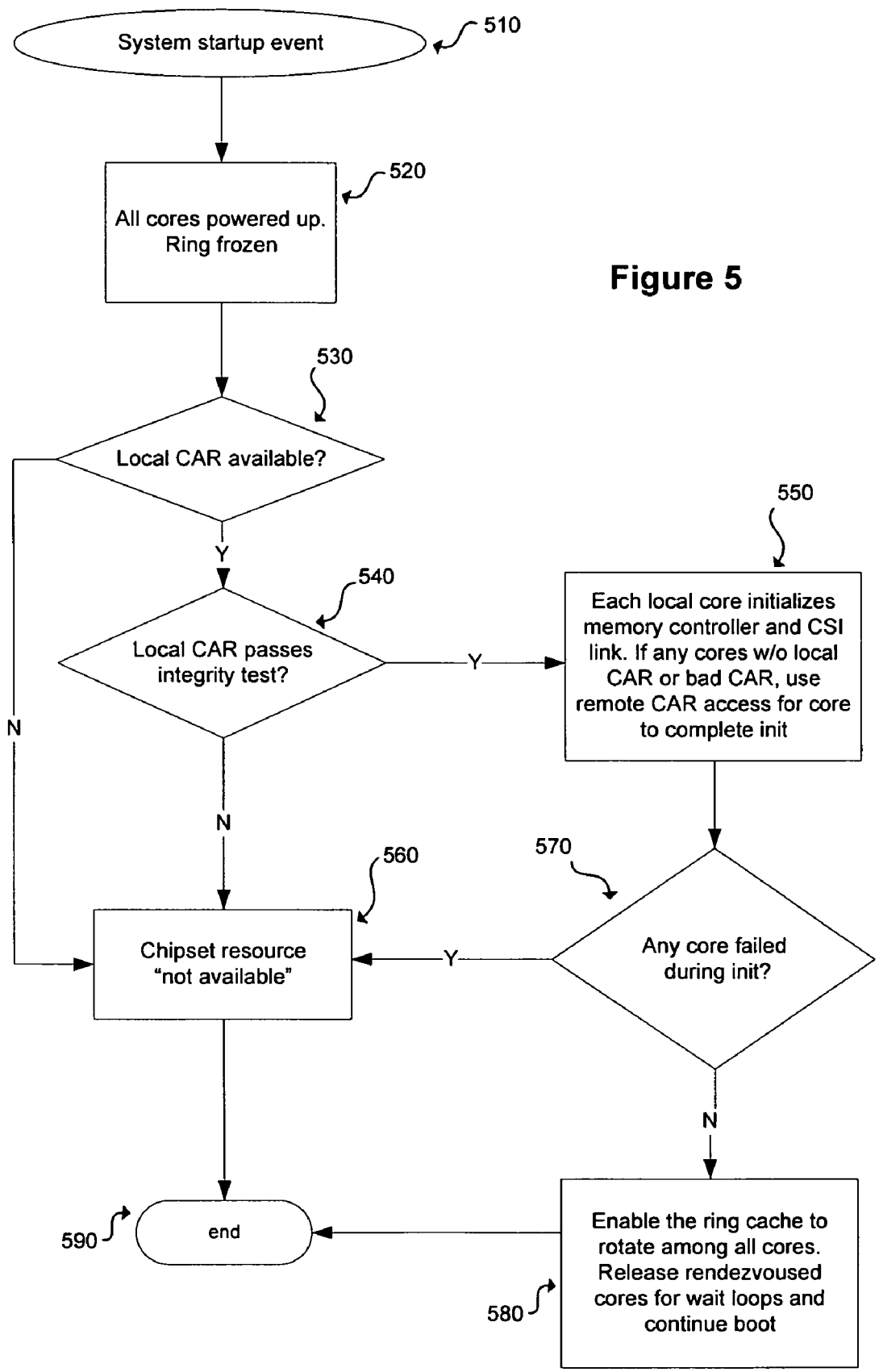
FIG. 5 depicts the flow of processing in one embodiment.

An exemplary flowchart for one embodiment is shown in FIG. 5. After a system startup event 510, and possibly some security validation procedures, all cores are powered up, and the ring cache is halted at block 520. Thus each core may have access to only one cache segment. At each core that is selected for the initialization process, a test for local CAR availability is performed, 530, and the CAR is tested if it is present, 540. If CAR is not available, or fails to pass integrity testing, the core is not available as a chipset resource 560 and various remedial actions may be taken, such as notification, logging, system halt, system panic, or others as is known. If the core and the cache for CAR are functional, each core in the process participates as dictated by firmware flows to perform various initialization tasks such as memory controller and CSI initialization 550. If a core fails during initialization, it is declared unavailable as a chipset resource, 570 and 560. Once the initialization process is complete, the cache ring is restarted and any rendezvoused cores are released for wait loops 580. Boot then continues in-memory as is known.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. A processor comprising:
a plurality of cores and a plurality of cache segments, each core associated with one of the cache segments; the cache segments interconnected by a data communication ring; and
logic to disallow operation of the ring at a startup event and to execute an initialization sequence at one or more of the cores so that each of the one or more of the cores operates using the cache segment associated with the core as a read-write memory during the initialization sequence.

2. The processor of claim 1 wherein the logic is further to perform a test to check the integrity of the cache segment associated with the core prior to execution of the initialization sequence; and if the test fails, to perform a remedial action.

3. The processor of claim 1 wherein the initialization sequence is further to initialize at least one of a memory controller and an interconnection system between the processor and other devices; and if the initialization sequence does not complete, to perform a remedial action.

4. The processor of claim 1 wherein the logic is further to enable operation of the ring after the initialization sequence is complete using a resource accessible to all cores for coordination.

5. The processor of claim 2 wherein the remedial action further comprises a global notification that the cache segment is not available.

6. The processor of claim 5 wherein the remedial action further comprises using a global resource to continue the execution of the initialization sequence for the core.

7. The processor of claim 3 wherein the remedial action further comprises a global notification that the core is not available.

8. A method performed at a startup event of a processor based system comprising:
   disallowing operation of a data communication ring interconnecting a plurality of processor cores of a processor of the system and a plurality of cache segments of the processor, each core associated with one of the cache segments; and
   executing an initialization sequence at one or more of the cores so that each of the one or more of the cores operates using the cache segment associated with the core as a read-write memory during the initialization sequence.

9. The method of claim 8 wherein the logic is further to perform a test to check the integrity of the cache segment associated with the core prior to execution of the initialization sequence; and if the test fails, to perform a remedial action.

10. The method of claim 9 further comprising initializing at least one of a memory controller and an interconnection system between the processor and other devices; and if the initializing does not complete, performing a remedial action.

11. The method of claim 8 further comprising enabling operation of the ring after the initialization sequence is complete using a resource accessible to all cores for coordination.

12. The method of claim 10 wherein performing the remedial action further comprises a making a global notification that the cache segment is not available.

13. The processor of claim 12 performing the remedial action further comprises using a global resource to continue the execution of the initialization sequence for the core.

14. The processor of claim 10 wherein performing the remedial action further comprises making a global notification that the core is not available.

15. A system comprising:
   a processor, the processor further comprising a plurality of cores and a plurality of cache segments, each core associated with one of the cache segments; the cache segments interconnected by a data communication ring; and
   logic to disallow operation of the ring at a startup event and to execute an initialization sequence at one or more of the cores so that each of the one or more of the cores operates using the cache segment associated with the core as a read-write memory during the initialization sequence.

16. The system of claim 15 wherein the logic is further to perform a test to check the integrity of the cache segment associated with the core prior to execution of the initialization sequence; and if the test fails, to perform a remedial action.

17. The system of claim 15 wherein the initialization sequence is further to initialize at least one of a memory controller and an interconnection system between the processor and other devices; and if the initialization sequence does not complete, to perform a remedial action.

18. The system of claim 15 wherein the logic is further to enable operation of the ring after the initialization sequence is complete using a resource accessible to all cores for coordination.

19. The system of claim 15 further comprising a dynamic random access memory (DRAM) connectively coupled to the processor.

* * * * *